No. 667,876. Patented Feb. 12, 1901.
P. HABEGER.
GRAIN THRESHER AND SEPARATOR.
(Application filed May 14, 1900.)
(No Model.)

Witnesses:
F. C. Stuart
R. C. Orwig

Inventor:
Peter Habeger,
By Thomas G. Orwig, Attorney

UNITED STATES PATENT OFFICE.

PETER HABEGER, OF WEST BEND, IOWA, ASSIGNOR TO W. A. HABEGER, OF SAME PLACE.

GRAIN THRESHER AND SEPARATOR.

SPECIFICATION forming part of Letters Patent No. 667,876, dated February 12, 1901.

Application filed May 14, 1900. Serial No. 16,584. (No model.)

*To all whom it may concern:*

Be it known that I, PETER HABEGER, a citizen of the United States, residing at West Bend, in the county of Palo Alto and State of Iowa, have invented a new and useful Improvement in Grain Threshers and Separators, of which the following is a specification.

My object is to provide means for more thoroughly shaking and separating straw and grain as they are passed rearward from the cylinder in a threshing-machine.

Heretofore cross-bars have been fixed to the side bars of a straw-shaker and tines fixed to the cross-bars. Auxiliary frames have also been fixed to the side bars of a straw-shaker to project upward and rearward and rakes pivotally connected with the free ends of the auxiliary frames; but in no instance have shaker-frames been provided with fixed tines and arranged and combined in a shaker and with curtains, as contemplated by my invention, which consists in the arrangement and combination of a plurality of auxiliary shakers or forks with a vibrating straw shaker and carrier, as hereinafter set forth, pointed out in my claims, and illustrated in the accompanying drawings, in which—

Figure 1:
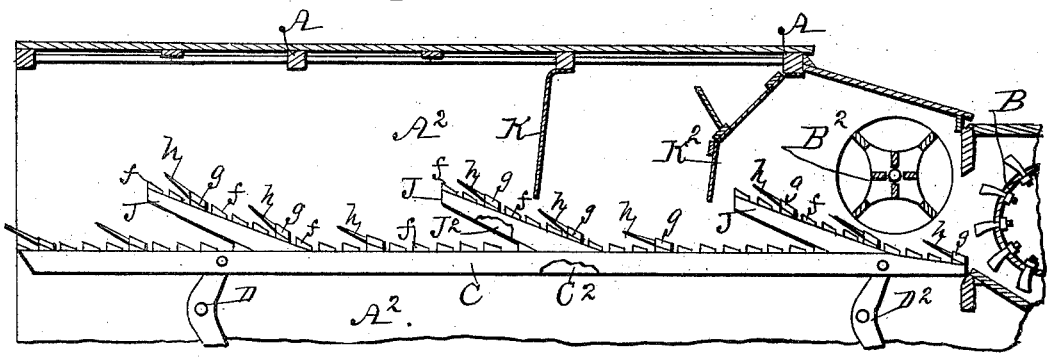
Figure 2:
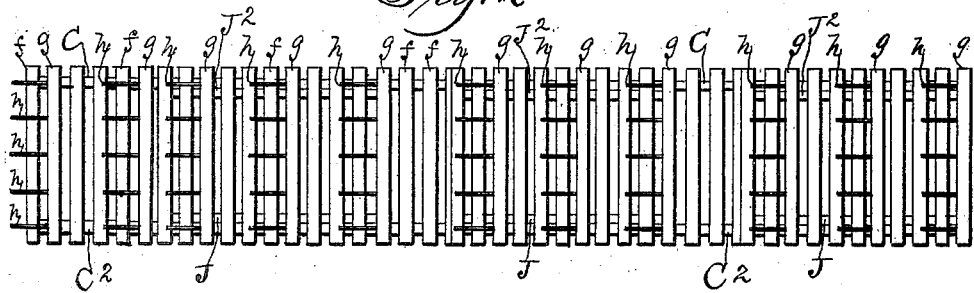

Figure 1 is a longitudinal sectional view of a portion of a thresher, a straw carrier and shaker, and my auxiliary shakers or forks combined therewith, as required for practical use. Fig. 2 is a top view of the improved straw shaker and carrier shown in Fig. 1.

The letter A designates a portion of the frame and top, and $A^2$ the side wall, of a threshing-machine.

B represents a threshing-cylinder, and $B^2$ a beater mounted in the front end portion of the machine-frame.

C and $C^2$ are the parallel side bars of the frame of a shaker mounted upon supports D and $D^2$, that are pivotally connected with the side walls of a machine in such a manner that when vibrated they will impart reciprocating longitudinal motions to the shaker and the auxiliary shakers or forks combined therewith and carried thereby. Cross-pieces $f$, fixed on the top surfaces of the side pieces of the main shaker-frame, have inclined top faces, as shown in Fig. 1.

At intervals along the length of the carrier-frame round bars or fork-tines $h$ are fixed to cross-pieces $g$ to extend rearward and upward from their rear faces in such a manner that straw will be elevated thereby and shaken thereon to facilitate the separation of grain from the straw.

Auxiliary frames and straw-shakers composed of parallel side pieces J and $J^2$ and cross-pieces $f'$ are fixed to the side bars of the main shaker-frame to extend upward and rearward therefrom, and a plurality of cross-pieces $g$, having fixed projections or tines $h$, extending upward and rearward, are also fixed to said auxiliary frames, as shown in Fig. 1, in such a manner that straw will be elevated thereby and shaken as it passes rearward from the cylinder and beater at the front end of the machine.

K and $K^2$ are flexible deflectors suspended over the straw shaker and carrier to prevent straw from being forced over the front portion of the shaker and carrier without being subjected to its shaking and separating action.

It is obvious that when straw is elevated by means of the auxiliary shakers it will at the same time be shaken and separated to facilitate dropping of the grain from the straw and that the straw also will drop from the ends of the fork tines or projections $h$ of the auxiliary shakers and in doing so aid in separating the grain from the straw during the passage of the straw and grain rearward from the cylinder.

Having thus described the construction and operation of my invention, its practical utility will be understood by persons familiar with the art to which it pertains.

What I therefore claim as new, and desire to secure by Letters Patent therefor, is—

1. In a thresher and separator, a straw-shaker comprising side bars, a plurality of cross-pieces fixed thereto, tines fixed to said cross-pieces to project rearward, auxiliary frames, composed of side pieces and cross-pieces, fixed to the side bars of the straw-shaker and tines fixed to the cross-pieces of the auxiliary frames, arranged and combined as shown and described to operate in the manner set forth for the purposes stated.

2. In a thresher and separator, a straw-shaker comprising side bars, a plurality of cross-pieces fixed thereto, tines fixed to said cross-pieces to project rearward, auxiliary frames composed of side pieces and cross-pieces fixed to the side bars of the straw-shaker and tines fixed to the cross-pieces of the auxiliary frames, and curtains fixed to the roof of the machine in rear of the cylinder and over the front end portion of the straw-shaker, arranged and combined as shown and described to operate in the manner set forth for the purposes stated.

PETER HABEGER.

Witnesses:
  W. B. LANG,
  W. K. SWEENY.